US012756146B2

(12) United States Patent
Yang et al.

(10) Patent No.: US 12,756,146 B2
(45) Date of Patent: Oct. 6, 2026

(54) INTERCHANGEABLE PLUG FOR A POWER ADAPTER AND METHODS FOR PROVIDING AND USING THE SAME

(71) Applicant: Belkin International, Inc., El Segundo, CA (US)

(72) Inventors: Linzhi Yang, Shenzhen (CN); Haiou Jiang, Shenzhen (CN); Ming Xu, Shenzhen (CN); Yan Zhuang, Shenzhen (CN); Haiqiang Zhong, Shenzhen (CN); Kwanghyun Choi, Fullerton, CA (US)

(73) Assignee: BELKIN INTERNATIONAL, INC., El Segundo, CA (US)

( * ) Notice: Subject to any disclaimer, the term of this patent is extended or adjusted under 35 U.S.C. 154(b) by 308 days.

(21) Appl. No.: 18/386,199

(22) Filed: Nov. 1, 2023

(65) Prior Publication Data

US 2025/0141168 A1 May 1, 2025

(51) Int. Cl.

*H01R 13/629* (2006.01)
*H01R 13/627* (2006.01)
*H01R 27/00* (2006.01)
*H01R 31/06* (2006.01)

(52) U.S. Cl.

CPC ......... *H01R 27/00* (2013.01); *H01R 13/6272* (2013.01); *H01R 13/629* (2013.01); *H01R 31/065* (2013.01)

(58) Field of Classification Search

CPC .. H01R 27/00; H01R 13/6272; H01R 13/629; H01R 31/065

See application file for complete search history.

(56) References Cited

U.S. PATENT DOCUMENTS 5,613,863 A * 3/1997 Klaus .................... H01R 31/06 D13/110
6,086,395 A 7/2000 Lloyd et al.
6,109,977 A 8/2000 Baxter
7,008,246 B2 * 3/2006 Zhuge .................. H01R 31/06 439/131
7,118,399 B1 10/2006 Wen (Continued)

FOREIGN PATENT DOCUMENTS

CN 202474956 U 10/2012
CN 202797468 U 3/2013

(Continued)

*Primary Examiner* — Thanh Tam T Le

(74) *Attorney, Agent, or Firm* — BRYAN CAVE LEIGHTON PAISNER LLP

(57) ABSTRACT

An interchangeable plug for a power adapter can include a first coupling mechanism raised above a rear surface of the interchangeable plug and configured to be releasably coupled to a first engagement mechanism of the power adapter when the interchangeable plug is mounted on the power adapter. The interchangeable plug further can include a second coupling mechanism raised above the rear surface of the interchangeable plug and configured to be releasably coupled to a second engagement mechanism of the power adapter when the interchangeable plug is mounted on the power adapter. The first coupling mechanism and the second coupling mechanism can be separate and located on opposite ends of the interchangeable plug. Other embodiments are described.

20 Claims, 7 Drawing Sheets

(56) References Cited

U.S. PATENT DOCUMENTS

| | | | | |
|---|---|---|---|---|
| 7,264,492 | B2 * | 9/2007 | Liang | H01R 24/28 439/151 |
| 7,300,297 | B1 * | 11/2007 | Wang | H01R 27/00 439/173 |
| 7,481,660 | B1 | 1/2009 | Tsai | |
| 7,563,115 | B2 | 7/2009 | Van Gen | |
| 7,621,765 | B1 * | 11/2009 | Wu | H01R 13/6272 439/173 |
| 7,794,251 | B2 * | 9/2010 | Wen | H01R 27/00 439/171 |
| 8,087,946 | B2 | 1/2012 | Namiki | |
| 8,579,656 | B2 | 11/2013 | Huang | |
| 8,888,513 | B2 | 11/2014 | Shi et al. | |
| 9,112,326 | B2 * | 8/2015 | Liu | H01R 24/68 |
| 9,166,351 | B1 * | 10/2015 | Wang | H01R 24/66 |
| 9,385,548 | B2 * | 7/2016 | Zou | H02J 7/70 |
| 9,537,276 | B1 | 1/2017 | Cai | |
| 9,985,397 | B2 | 5/2018 | Jiang | |
| 10,270,214 | B2 | 4/2019 | Jiang | |
| 10,297,965 | B1 * | 5/2019 | Yang | H01R 31/06 |
| 10,312,704 | B2 | 6/2019 | De Iullis | |
| 10,601,194 | B1 * | 3/2020 | Chien | H01R 24/78 |
| 10,790,628 | B2 | 9/2020 | Landwehr | |
| 10,797,425 | B1 * | 10/2020 | Young | H01R 13/35 |
| 10,965,076 | B2 | 3/2021 | Lamb | |
| 10,996,695 | B2 * | 5/2021 | Chien | H01R 13/6675 |
| 11,223,171 | B2 | 1/2022 | Zhang | |
| 11,476,627 | B2 * | 10/2022 | Pan | H01R 35/04 |
| 12,080,976 | B2 * | 9/2024 | Lee | H01R 24/68 |
| 12,224,539 | B2 * | 2/2025 | Liao | H01R 24/68 |
| 12,341,291 | B2 * | 6/2025 | Liao | H01R 13/6272 |
| 2021/0036537 | A1 | 2/2021 | Yang | |
| 2021/0050697 | A1 | 2/2021 | Landwehr | |
| 2021/0305827 | A1 | 9/2021 | Guo | |
| 2022/0263329 | A1 | 8/2022 | Wei | |
| 2022/0393393 | A1 | 12/2022 | Liao | |

FOREIGN PATENT DOCUMENTS

| | | | |
|---|---|---|---|
| CN | 203103713 | U | 7/2013 |
| CN | 204068361 | U | 12/2014 |
| CN | 205195007 | U | 4/2016 |
| CN | 205753495 | U | 11/2016 |
| CN | 205791681 | U | 12/2016 |
| CN | 205911503 | U | 1/2017 |
| CN | 206422343 | U | 8/2017 |
| CN | 107181115 | A | 9/2017 |
| CN | 207218336 | U | 4/2018 |
| CN | 207426368 | U | 5/2018 |
| CN | 207530553 | U | 6/2018 |
| CN | 207967528 | U | 10/2018 |
| CN | 207994238 | U | 10/2018 |
| CN | 208014995 | U | 10/2018 |
| CN | 208157800 | U | 11/2018 |
| CN | 209658566 | U | 11/2019 |
| CN | 210326383 | U | 4/2020 |
| CN | 210838191 | U | 6/2020 |
| CN | 210838204 | U | 6/2020 |
| CN | 211182748 | U | 8/2020 |
| CN | 211605583 | U | 9/2020 |
| CN | 112564207 | A | 3/2021 |
| CN | 213184867 | U | 5/2021 |
| CN | 213212546 | U | 5/2021 |
| CN | 113131257 | A | 7/2021 |
| CN | 113131260 | A | 7/2021 |
| CN | 213602034 | U | 7/2021 |
| CN | 214045080 | U | 8/2021 |
| CN | 214314603 | U | 9/2021 |
| CN | 214478060 | U | 10/2021 |
| CN | 214754607 | U | 11/2021 |
| CN | 214849330 | U | 11/2021 |
| CN | 214849353 | U | 11/2021 |
| CN | 215343954 | U | 12/2021 |
| CN | 215497305 | U | 1/2022 |
| CN | 215497427 | U | 1/2022 |
| CN | 215733515 | U | 2/2022 |
| CN | 215989329 | U | 3/2022 |
| CN | 216389881 | U | 4/2022 |
| CN | 216413469 | U | 4/2022 |
| CN | 216624791 | U | 5/2022 |
| CN | 216648730 | U | 5/2022 |
| CN | 216648771 | U | 5/2022 |
| CN | 216773694 | U | 6/2022 |
| CN | 216773695 | U | 6/2022 |
| CN | 216852624 | U | 6/2022 |
| CN | 216903643 | U | 7/2022 |
| CN | 217062705 | U | 7/2022 |
| CN | 217134835 | U | 8/2022 |
| CN | 217281444 | U | 8/2022 |
| CN | 217306825 | U | 8/2022 |
| CN | 217405869 | U | 9/2022 |
| CN | 217406210 | U | 9/2022 |
| CN | 217720105 | U | 11/2022 |
| CN | 115693256 | A | 2/2023 |
| CN | 218498527 | U | 2/2023 |
| EP | 2615701 | B1 | 6/2016 |
| EP | 3195421 | B1 | 10/2019 |
| WO | 2020062197 | A1 | 4/2020 |

* cited by examiner

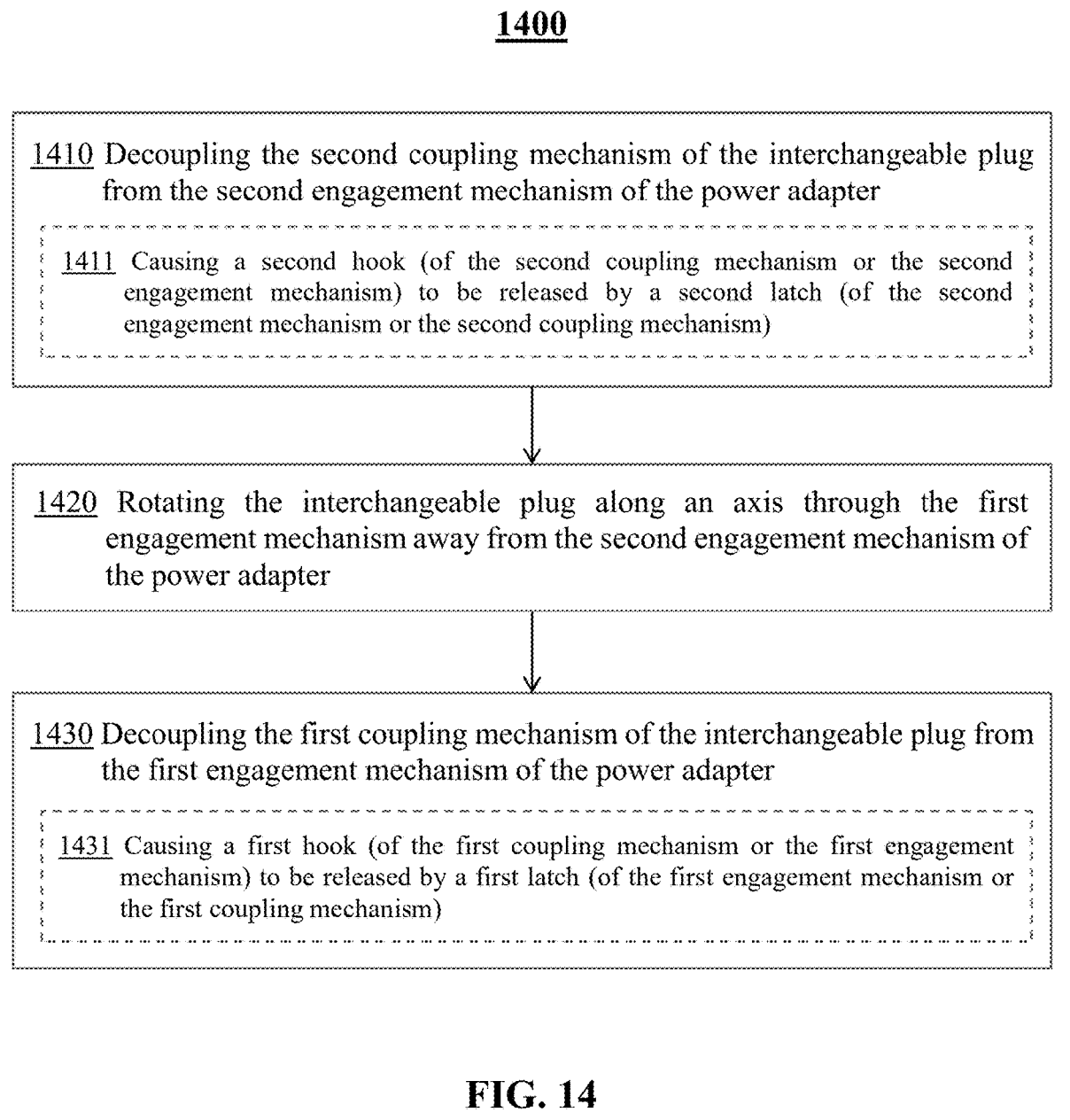

1400

1410 Decoupling the second coupling mechanism of the interchangeable plug from the second engagement mechanism of the power adapter 1411 Causing a second hook (of the second coupling mechanism or the second engagement mechanism) to be released by a second latch (of the second engagement mechanism or the second coupling mechanism)

↓

1420 Rotating the interchangeable plug along an axis through the first engagement mechanism away from the second engagement mechanism of the power adapter

↓

1430 Decoupling the first coupling mechanism of the interchangeable plug from the first engagement mechanism of the power adapter 1431 Causing a first hook (of the first coupling mechanism or the first engagement mechanism) to be released by a first latch (of the first engagement mechanism or the first coupling mechanism)

FIG. 14

INTERCHANGEABLE PLUG FOR A POWER ADAPTER AND METHODS FOR PROVIDING AND USING THE SAME

TECHNICAL FIELD

This disclosure relates generally to an interchangeable plug for a power adapter for electrical devices.

BACKGROUND

As people have become increasingly dependent on electronic devices, charging the electronic devices has become a daily routine. However, when a user travels to foreign countries, the power adapter(s) for the user's electronic devices are not always compatible with local power outlets. Using a separate power adapter for each type of power outlets can be costly and take up precious luggage space, compared to using interchangeable plugs with relatively simple mechanical components and smaller sizes, in particular when the user travels to multiple countries (e.g., the UK and France). Therefore, an interchangeable plug for a power adapter is desired.

BRIEF DESCRIPTION OF THE DRAWINGS

To facilitate further description of the embodiments, the following drawings are provided in which:

FIG. 14 illustrates a flow chart of a method for dismounting an interchangeable plug mounted from a portable power adapter, according to an embodiment.

Figure 1:
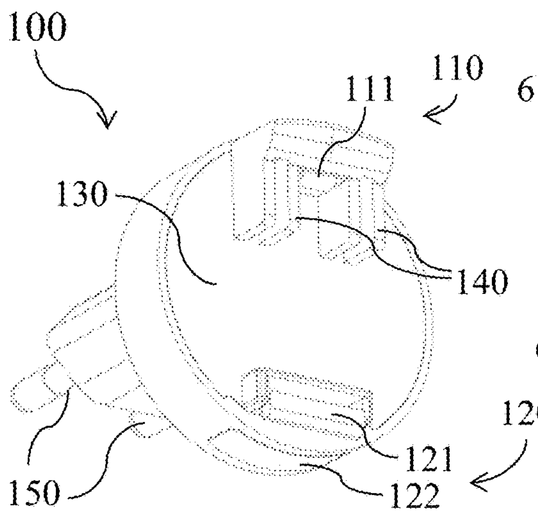
FIG. 1 illustrates a bottom, rear, right side perspective view of an interchangeable plug, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include an interchangeable plug for a power adapter. The power adapter can be an AC adapter, an AC/DC adapter, or any type of external power supply for one or more electrical devices (e.g., a laptop computer, a mobile phone, a tablet computer, a powerbank, etc.). The power adapter can be portable and include one or more connectors (e.g., USB connectors, DC connectors, etc.) to be used with suitable cables (e.g., USB cables, auxiliary power cables, etc.). The power adapter can include adapter prongs.

The adapter prongs of the power adapter can be foldable and include a folded position when the adapter prongs are folded in one or more adapter-prong channels. The adapter prongs of the power adapter further can include an unfolded position when the adapter prongs are protruding from a front surface of the power adapter so that the adapter prongs can be connected to or removed from matching female contacts of a power socket. The interchangeable plug can be configured to be mounted onto or dismounted from the power adapter. The plug prong arrangement for the plug prongs of the interchangeable plug can be different from the adapter prong arrangement for the adapter prongs of the power adapter so that the power adapter can be used with different types of power sockets when a user travels in foreign countries.

In many embodiments, the interchangeable plug can include a first coupling mechanism raised above a rear surface of the interchangeable plug and configured to be releasably coupled to a first engagement mechanism of the power adapter when the interchangeable plug is mounted on the power adapter. The first coupling mechanism of the interchangeable plug can be releasably coupled to the first engagement mechanism of the power adapter using any suitable mechanisms when the interchangeable plug is mounted on the power adapter. For example, the first coupling mechanism can be releasably coupled to the first engagement mechanism by a first hook of the first coupling mechanism received by a first latch of the first engagement mechanism, or a first hook of the first engagement mechanism received by a first latch of the first coupling mechanism, etc.

In a number of embodiments, the interchangeable plug further can include a second coupling mechanism raised above the rear surface of the interchangeable plug and configured to be releasably coupled to a second engagement mechanism of the power adapter when the interchangeable plug is mounted on the power adapter. In many embodiments, the first coupling mechanism and the second coupling mechanism can be separate and located on opposite ends of the interchangeable plug. The first engagement mechanism and the second engagement mechanism of the power adapter also can be located at opposite sides of the adapter prongs of the power adapter.

The second coupling mechanism of the interchangeable plug can be releasably coupled to the second engagement mechanism of the power adapter using any suitable mechanisms. For example, the second coupling mechanism can be releasably coupled to the second engagement mechanism by a second hook of the second coupling mechanism received by a second latch of the second engagement mechanism, or a second hook of the second engagement mechanism received by a second latch of the second coupling mechanism, etc.

In many embodiments, the second hook (of the second coupling mechanism of the interchangeable plug or the second engagement mechanism of the power adapter) or the second latch (of the second engagement mechanism of the power adapter or the second coupling mechanism of the interchangeable plug) can be movable. For example, the second hook or the second latch can be moved by a button (e.g., a spring-loaded button to be pushed or pressed to slide) of the second coupling mechanism of the interchangeable plug or the second engagement mechanism of the power adapter.

In some embodiments, the second hook (of the second coupling mechanism of the interchangeable plug or the second engagement mechanism of the power adapter) can be movable to be received or released by the second latch (of the second engagement mechanism of the power adapter or the second coupling mechanism of the interchangeable plug) along a single direction along which the adapter prongs of the power adapter extend when the adapter prongs are in the folded position. In different or similar embodiments, the second latch (of the second engagement mechanism of the power adapter or the second coupling mechanism of the interchangeable plug) can be movable to receive or release the second hook (of the second coupling mechanism of the interchangeable plug or the second engagement mechanism of the power adapter) along the single direction along which the adapter prongs of the power adapter extend when the adapter prongs are in the folded position.

In a number of embodiments, the second hook (of the second coupling mechanism of the interchangeable plug or the second engagement mechanism of the power adapter) can be movable toward or away from the first coupling mechanism of the interchangeable plug or the first engagement mechanism of the power adapter to be received or released by the second latch (of the second engagement mechanism of the power adapter or the second coupling mechanism of the interchangeable plug). In different or similar embodiments, the second latch (of the second engagement mechanism of the power adapter or the second coupling mechanism of the interchangeable plug) can be movable toward or away from the first engagement mechanism of the interchangeable plug to receive or release the second hook of the second coupling mechanism.

In many embodiments, the interchangeable plug further can include adapter prong contacts electronically coupled to the plug prongs of the interchangeable plug. The adapter prong contacts can be configured to be electronically coupled to the adapter prongs of the power adapter to build an electric path between the plug prongs of the interchangeable plug and the adapter prongs of the power adapter when the interchangeable plug is mounted on the power adapter.

In some embodiments, the interchangeable plug further can include one or more alignment structures located between the first coupling mechanism and the second coupling mechanism. The one or more alignment structures can be raised from the rear surface of the interchangeable plug and configured to be received in one or more adapter-prong channels of the power adapter for the adapter prongs when the interchangeable plug is mounted on the power adapter. In certain embodiments, the one or more alignment structures, when received in the adapter-prong channel(s), can receive at least a part of the adapter prongs folded in the adapter-prong channel(s). For example, the one or more alignment structures can include one or more ribs extending from the first coupling mechanism toward the second coupling mechanism and parallel to the folded adapter prongs when the interchangeable plug is mounted on the power adapter.

In several embodiments wherein the interchangeable plug include multiple alignment structures (e.g., four ribs to be used with a type-A power adapter), the adapter prong contacts can each include a respective spring contact protruding from the rear surface of the interchangeable plug between two of the multiple alignment structures to protect the respective spring contact from wear and tear. In many embodiments, the power adapter can be portable and further can include one or more of USB connectors, DC connectors, and/or any suitable connectors to be coupled to one or more electrical devices, via one or more suitable cables (e.g., USB cables or power cords). In different or similar embodiments, the power adapter can include a power cord that is fixed to the power adapter and configured to couple (fixed or releasably) the power adapter to an electrical device.

Various embodiments can include a method for providing an interchangeable plug for a power adapter. The interchangeable plug can be similar or identical to any of the interchangeable plugs as discussed above. The power adapter also can be similar or identical to any of the power adapters as discussed above.

Various embodiments further can include a method for using an interchangeable plug for a power adapter. The interchangeable plug can be similar or identical to any of the interchangeable plugs as discussed above. The power adapter can be similar or identical to any of the power adapters as discussed above.

In many embodiments, the method can include mounting the interchangeable plug onto the power adapter. Mounting the interchangeable plug onto the power adapter can include releasably coupling a first coupling mechanism of the interchangeable plug to a first engagement mechanism of the power adapter. In some embodiments, the first coupling mechanism can be raised above a rear surface of the interchangeable plug. Releasably coupling the first coupling mechanism of the interchangeable plug to the first engagement mechanism of the power adapter can be implemented in any suitable manners, such as causing a first hook (of the first coupling mechanism of the interchangeable plug or the first engagement mechanism of the power adapter) to be received by a first latch (of the first engagement mechanism of the power adapter or the first coupling mechanism of the interchangeable plug).

In a number of embodiments, mounting the interchangeable plug onto the portable power adapter further can include releasably coupling a second coupling mechanism of the interchangeable plug to a second engagement mechanism of the portable power adapter. The second coupling mechanism can be raised above the rear surface of the interchangeable plug. The first coupling mechanism and the second coupling mechanism can be separate and located on opposite ends of the interchangeable plug. Releasably coupling the second coupling mechanism of the interchangeable plug to the second engagement mechanism of the portable power adapter can be implemented in any suitable manners, such as causing a second hook (of the second coupling mechanism of the interchangeable plug or the second engagement mechanism of the power adapter) to be received by a second latch (of the second engagement mechanism of the power adapter or the second coupling mechanism of the interchangeable plug).

In a number of embodiments, mounting the interchangeable plug onto the power adapter further can include after releasably coupling the first coupling mechanism of the interchangeable plug to the first engagement mechanism of the power adapter and before releasably coupling the second coupling mechanism of the interchangeable plug to the second engagement mechanism of the power adapter, rotating the interchangeable plug along an axis through the first engagement mechanism toward the second engagement mechanism of the power adapter.

In many embodiments, the method further can include dismounting the interchangeable plug from the power adapter. Dismounting the interchangeable plug from the power adapter can include decoupling the second coupling mechanism of the interchangeable plug from the second engagement mechanism of the power adapter. In several embodiments, decoupling the second coupling mechanism from the second engagement mechanism can include causing the second hook (of the second coupling mechanism of the interchangeable plug or the second engagement mechanism of the power adapter) to be released by the second latch (of the second engagement mechanism of the power adapter or the second coupling mechanism of the interchangeable plug).

In a number of embodiments, dismounting the interchangeable plug from the power adapter further can include decoupling the first coupling mechanism of the interchangeable plug from the first engagement mechanism of the power adapter. Decoupling the first coupling mechanism from the first engagement mechanism can include causing the first hook (of the first coupling mechanism of the interchangeable plug or the first engagement mechanism of the power adapter) to be released by the first latch (of the first engagement mechanism of the power adapter or the first coupling mechanism of the interchangeable plug).

In several embodiments, dismounting the interchangeable plug from the power adapter further can include after decoupling the second coupling mechanism of the interchangeable plug from the second engagement mechanism of the power adapter and before decoupling the first coupling mechanism of the interchangeable plug from the first engagement mechanism of the power adapter, rotating the interchangeable plug along an axis through the first engagement mechanism away from the second engagement mechanism of the power adapter.

Figure 2:
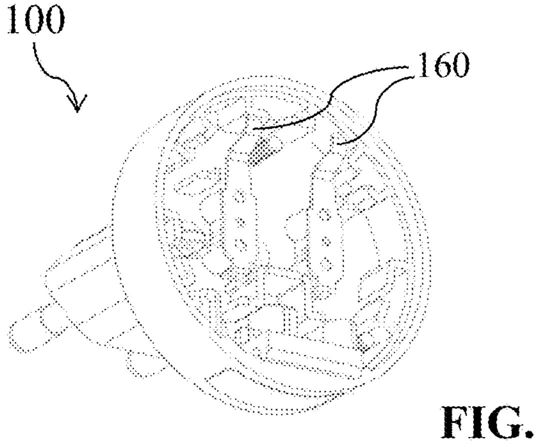
FIG. 2 illustrates a bottom, rear, right side perspective view of the interchangeable plug of FIG. 1 with a rear cover removed.
Figure 3:
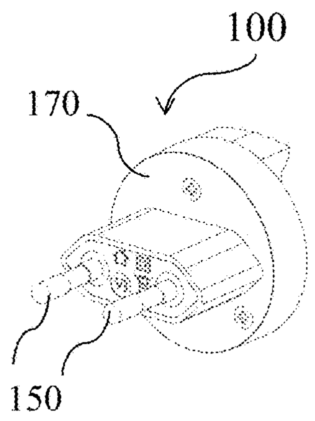
FIG. 3 illustrates a top, front, right side perspective view of the type-C interchangeable plug of FIG. 1, according to an embodiment.

Turning to the drawings, FIGS. 1-3 illustrate an interchangeable plug 100, according to an embodiment. Interchangeable plug 100 is merely exemplary, and embodiments of the interchangeable plug are not limited to embodiments presented herein. The interchangeable plug can be employed in many different embodiments or examples not specifically depicted or described herein. Interchangeable plug 100 can include: (a) a first coupling mechanism 110 raised above a rear surface 130, (b) a second coupling mechanism 120 raised above rear surface 130, (c) alignment structures 140 raised above rear surface 130, (d) plug prongs 150 extending from a front surface 170 away from rear surface 130, and/or (e) adapter prong contacts 160 electronically coupled to plug prongs 150.

Figure 4:
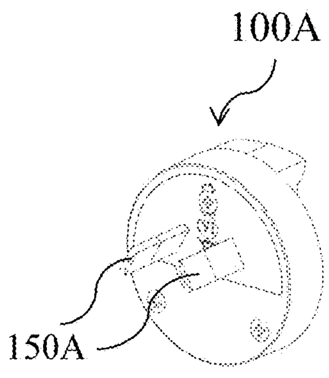
FIG. 4 illustrates a top, front, right side perspective view of a type-I interchangeable plug, according to an embodiment.
Figure 5:
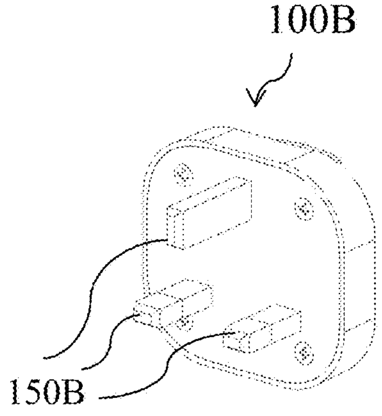
FIG. 5 illustrates a top, front, right side perspective view of a type-G interchangeable plug, according to an embodiment.

As shown in FIG. 1, first coupling mechanism 110 and second coupling mechanism 120 are separate and located on opposite ends of interchangeable plug 100. Alignment structures 140 are located between first coupling mechanism 110 and second coupling mechanism 120. First coupling mechanism 110 can include a first hook 111. Second coupling mechanism 120 can include a second hook 121 and a spring-loaded button 122 that can move or be moved by second hook 121. The plug prong arrangement for plug prongs 150 can be any suitable arrangement. For example, interchangeable plug 100 in FIGS. 1-3 is a type-C plug with two plug prongs 150. Interchangeable plug 100A in FIG. 4 is a type-I interchangeable plug with two plug prongs 150A. Interchangeable plug 100B in FIG. 5 is a type-G interchangeable plug with three plug prongs 150B.

Figure 6:
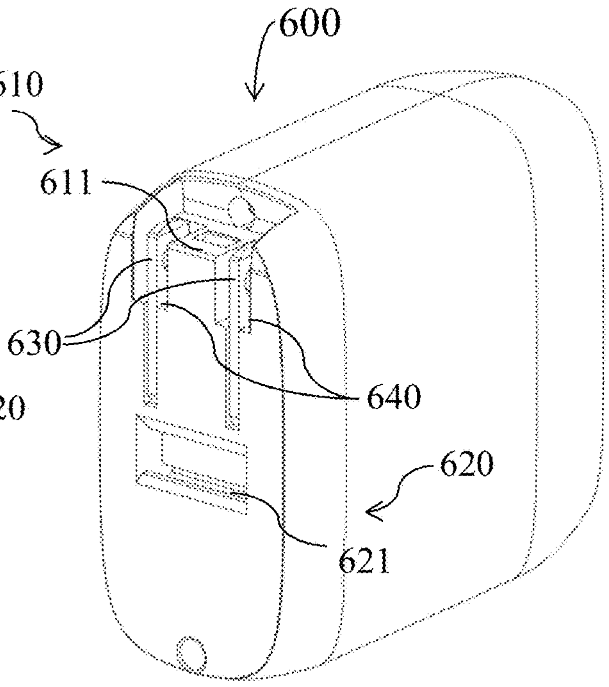
FIG. 6 illustrates a top, front, right side perspective view of a type-A portable power adapter with adapter prongs in a folded position, according to an embodiment.

Turning ahead in the drawings, FIG. 6 illustrates a portable power adapter 600, according to an embodiment. Power adapter 600 is merely exemplary, and embodiments of the power adapter are not limited to embodiments presented herein. The power adapter can be employed in many different embodiments or examples not specifically depicted or described herein. Power adapter 600 can include a first engagement mechanism 610 and a second engagement mechanism 620. First engagement mechanism 610 can include a first latch 611. Second engagement mechanism 620 can include a second latch 621. Further, power adapter 600 can have foldable adapter prongs 630 and be of any suitable types, such as type A (as shown in FIG. 6), type B, type C, or type I, etc. Adapter prongs 630 can include: (a) a folded position (as shown in FIG. 6) when adapter prongs 630 are folded inside adapter-prong channels 640 and ready to be used with an interchangeable plug (e.g., interchangeable plug 100 (FIG. 1), 100A (FIG. 4), 100B (FIG. 5), etc.), and (b) an unfolded position (not shown) when adapter prongs 630 are unfolded and ready to be connected to a wall socket with matching female contacts.

Figure 7:
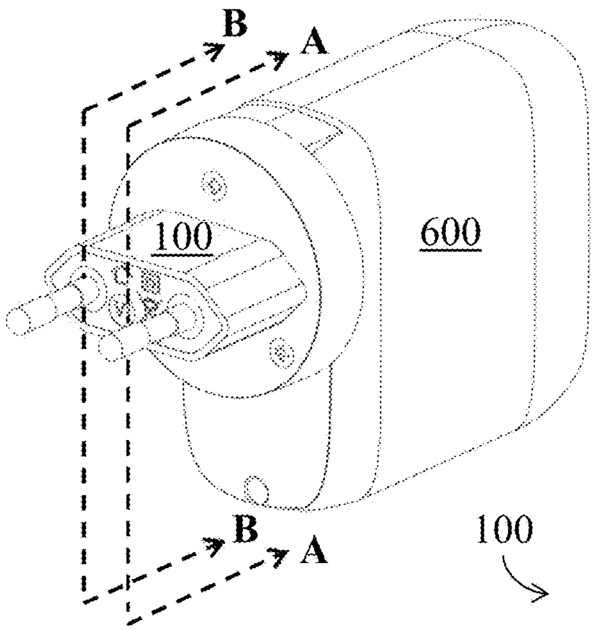
FIG. 7 illustrates a top, front, right side perspective view of the interchangeable plug of FIG. 1 mounted on the portable power adapter of FIG. 6.
Figure 8:
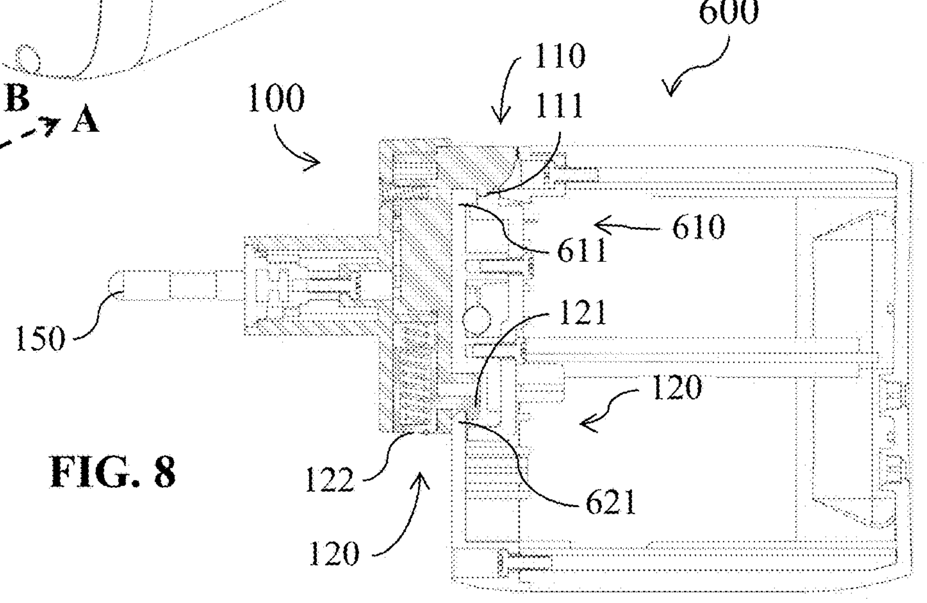
FIG. 8 illustrates a cross-sectional view of the interchangeable plug of FIG. 1 mounted on the portable power adapter of FIG. 6, along a respective virtual line A-A in FIG. 7.
Figure 9:
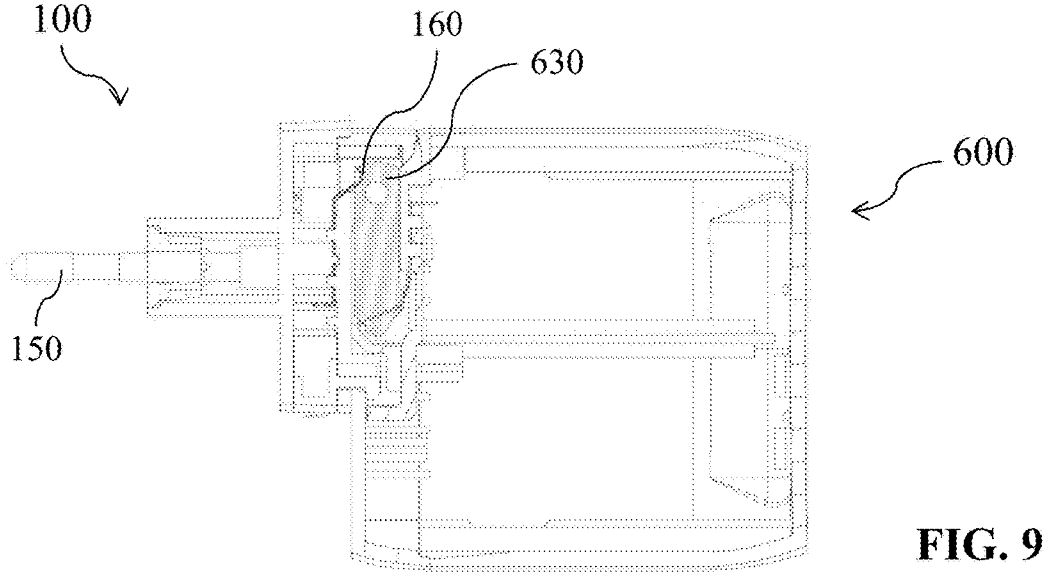
FIG. 9 illustrates a cross-sectional view of the interchangeable plug of FIG. 1 mounted on the portable power adapter of FIG. 6, along a respective virtual line B-B in FIG. 7.

Turning ahead in the drawings, FIGS. 7-9 illustrate various views of an interchangeable plug (e.g., interchangeable plug 100 (FIG. 1)) mounted on a power adapter (e.g., power adapter 600 (FIG. 6)), according to an embodiment. When interchangeable plug 100 is mounted on power adapter 600, first engagement mechanism 610 can be releasably coupled to first coupling mechanism 110, and second engagement mechanism 620 can be releasably coupled to second coupling mechanism 120. When first engagement mechanism 610 is coupled to first coupling mechanism 110, first hook 111 of first coupling mechanism 110 can be received by first latch 611 of first engagement mechanism 610. When second engagement mechanism 620 is coupled to second coupling mechanism 120, second hook 121 of second coupling mechanism 120 can be received by second latch 621 of second engagement mechanism 620.

In embodiments as shown in FIGS. 7-9, second hook 121 can be movable to be received or released by second latch 621: (a) along a single direction along which adapter prongs 630 extend when adapter prongs 630 are in a folded position (e.g., up or down as shown in FIG. 9), and/or (b) toward or away from first coupling mechanism 110. In some embodiments, second hook 121 can be configured to move with button 122 so that without external force applied, the spring of button 122 can maintain the position of second hook 121. For example, when a user pushes second coupling mechanism 120 of interchangeable plug 100 to be received by second engagement mechanism 620, second hook 121 can be pushed by second latch 621 to move toward first coupling mechanism 110 and then be forced by the spring of button 122 to return to the original position of second hook 121 (away from first coupling mechanism 110) as shown in FIG. 8.

In different or similar embodiments (not shown), a second latch of a second engagement mechanism of a power adapter can be movable (with or without a spring-loaded button or a similar component) to receive or release a second hook of a second coupling mechanism of an interchangeable plug: (a) along a single direction along which adapter prongs of the power adapter extend when the adapter prongs are in a folded position, and/or (b) toward or away from a first engagement mechanism of the power adapter.

Further, when interchangeable plug 100 is mounted on power adapter 600, adapter prong contacts 160 can contact and/or be electronically coupled to adapter prongs 630 of power adapter 600 (as shown in FIG. 9), and alignment structures 140 (FIG. 1, not shown here) can be received in adapter-prong channels 640 (FIG. 6, not shown here) to prevent lateral movements.

Figure 10:
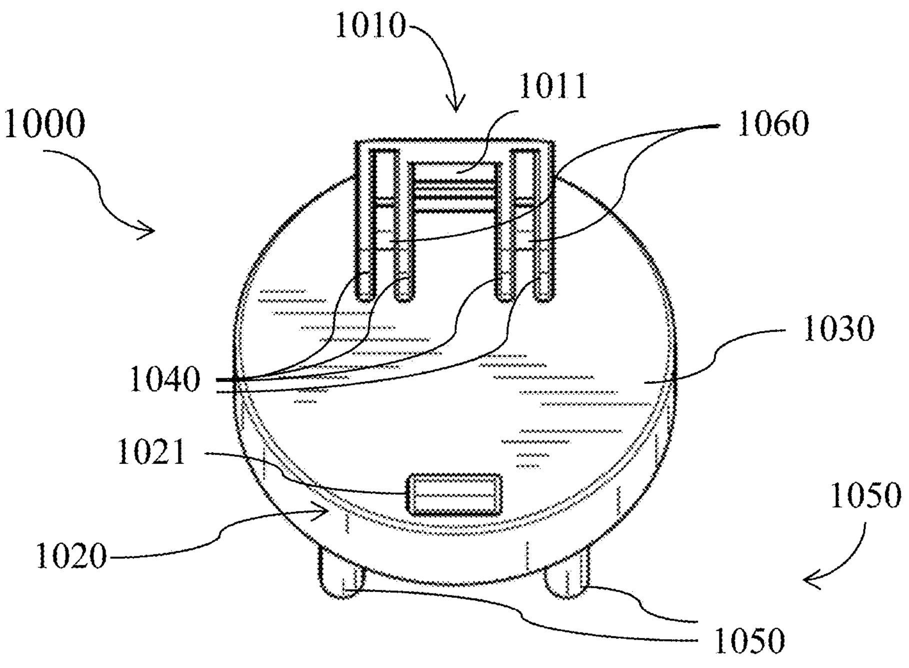
FIG. 10 illustrates a bottom, rear perspective view of an interchangeable plug, according to an embodiment.

Turning ahead in the drawings, FIG. 10 illustrates an interchangeable plug 1000, according to an embodiment. Interchangeable plug 1000 can be similar or identical to any of the interchangeable plugs discussed above (e.g., interchangeable plug 100 (FIGS. 1-3), 100A (FIG. 4), or 100B (FIG. 5), etc.), and various elements of interchangeable plug 1000 can be similar or identical to various elements of any of those interchangeable plugs. Interchangeable plug 1000 can include: (a) a first coupling mechanism 1010 with a first latch 1011; (b) a second coupling mechanism 1020 with a second hook 1021; (c) a rear surface 1030; (d) alignment structures 1040; (e) plug prongs 1050; and/or (f) adapter prong contacts 1060 electronically coupled to plug prongs 1050. First coupling mechanism 1010 and second coupling mechanism 1020 can be separate and located on opposite ends of interchangeable plug 1000.

Figure 11:
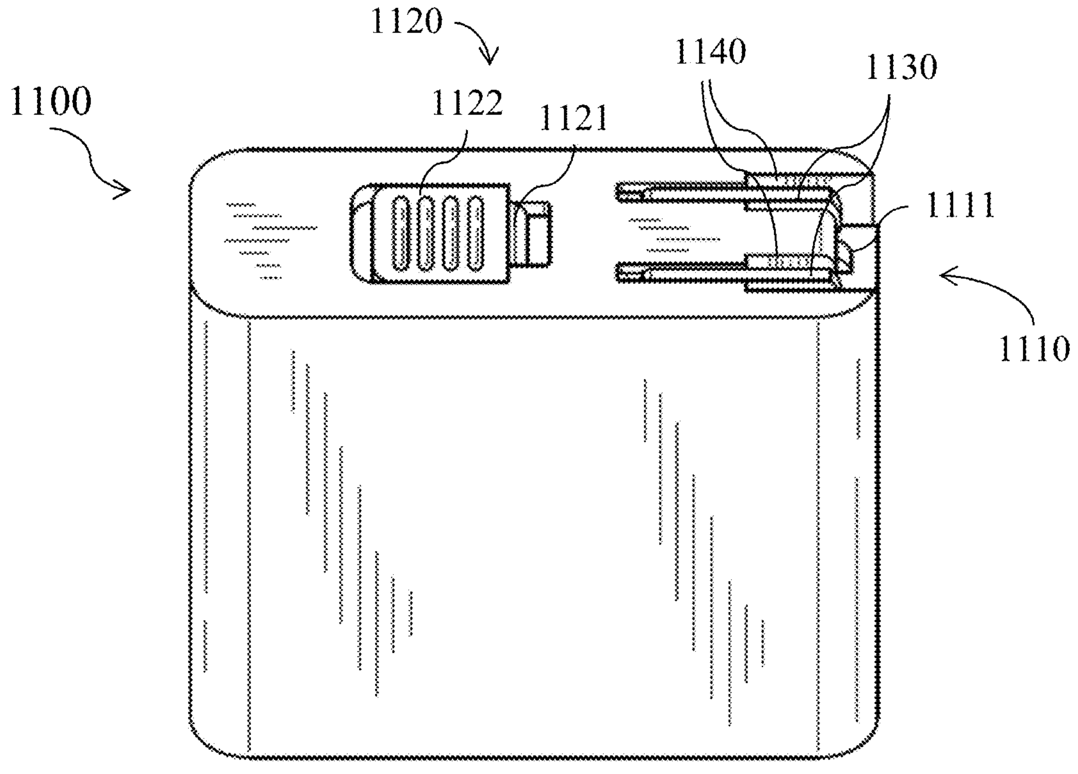
FIG. 11 illustrates a front, right side perspective view of a type-A portable power adapter with adapter prongs in a folded position, according to an embodiment.

Turning ahead in the drawings, FIG. 11 illustrates a portable power adapter 1100, according to an embodiment. Power adapter 1100 can be similar or identical to any of the power adapters discussed above (e.g., power adapter 600 (FIG. 6)), and various elements of power adapter 1100 can be similar or identical to various elements of any of those power adapters. Power adapter 1100 can include: (a) a first engagement mechanism 1110 with a first hook 1111; (b) a second engagement mechanism 1120 with a second latch 1121 and a spring-loaded slide button 1122; (c) foldable adapter prongs 1130 with a folded position (see, FIG. 11) and an unfolded position; and/or (d) adapter-prong channels 1140. First engagement mechanism 1110 and second engagement mechanism 1120 are located at opposite sides of adapter prongs 1130.

Power adapter 1100 can be used with any suitable interchangeable plugs as discussed above (e.g., interchangeable plug 100 (FIGS. 1-3), 100A (FIG. 4), 100B (FIG. 5), or 1000 (FIG. 10), etc.). For example, interchangeable plug 1000 (FIG. 10) can be mounted on power adapter 1100 by first coupling mechanism 1010 (FIG. 10) releasably coupled to first engagement mechanism 1110 and second coupling mechanism 1020 (FIG. 10) releasably coupled to second engagement mechanism 1120. First coupling mechanism 1010 (FIG. 10) can be coupled to first engagement mechanism 1110 when first hook 1111 is received by first latch 1011 (FIG. 10). Second coupling mechanism 1020 (FIG. 10) can be coupled to second engagement mechanism 1120 when second hook 1021 (FIG. 10) is received by second latch 1121. When interchangeable plug 1000 (FIG. 10) is mounted on power adapter 1100, alignment structures 1040 (FIG. 10) can be received in adapter-prong channels 1140, with each of adapter prongs 1130 partly located between a respective pair of alignment structures 1040 (FIG. 10).

In a number of embodiments, second latch 1121 of second engagement mechanism 1120 can be movable with slide button 1122 to receive or release second hook 1021 of second coupling mechanism 1020 (FIG. 10): (a) along a single direction along which adapter prongs 1130 of power adapter 1100 extend when adapter prongs 1130 are in the folded position (e.g., left or right as shown in FIG. 11); and/or (b) toward or away from first engagement mechanism 1110.

Figure 12:
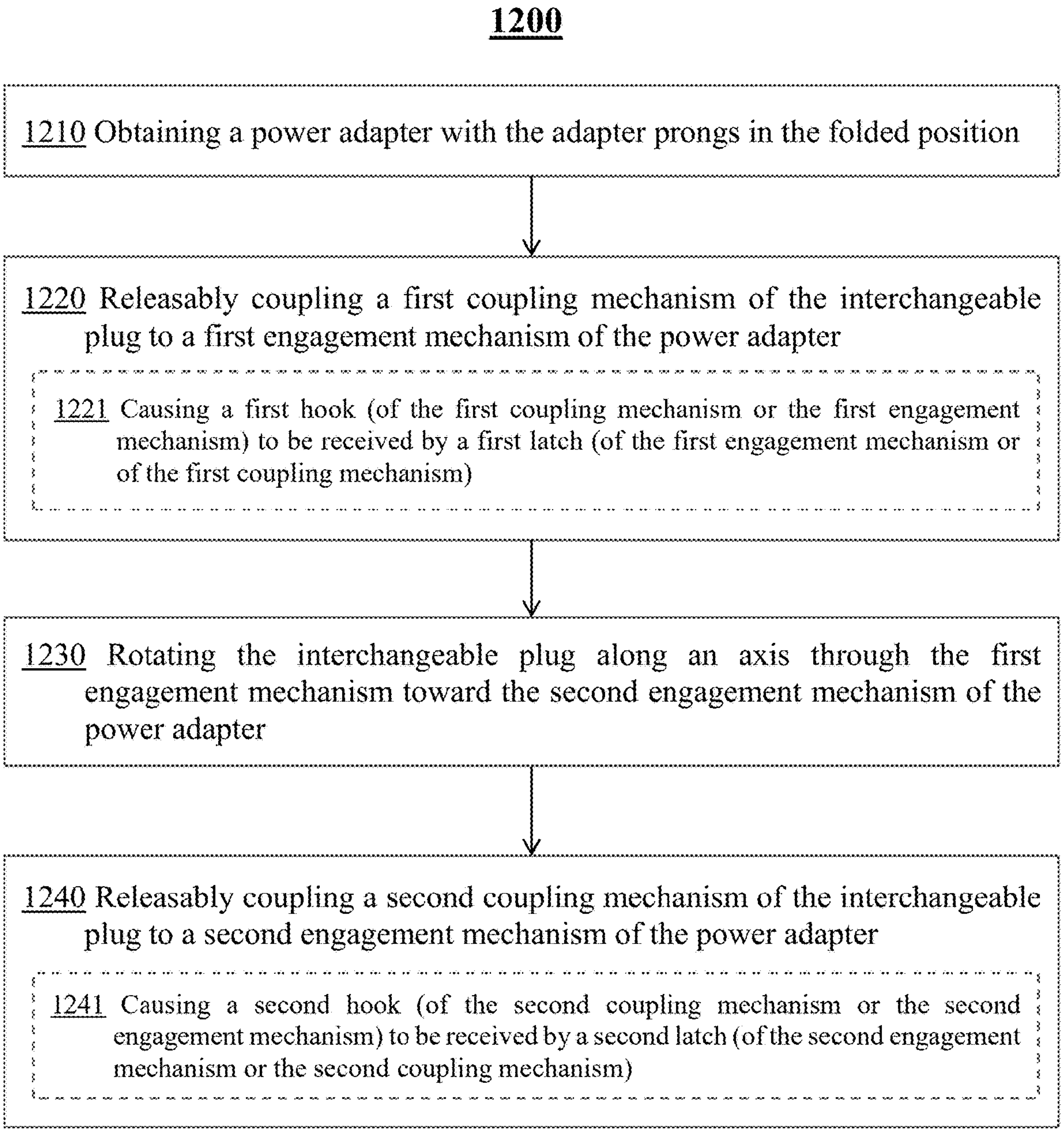
FIG. 12 illustrates a flow chart of a method for mounting an interchangeable plug onto a portable power adapter, according to an embodiment.
Figure 13:
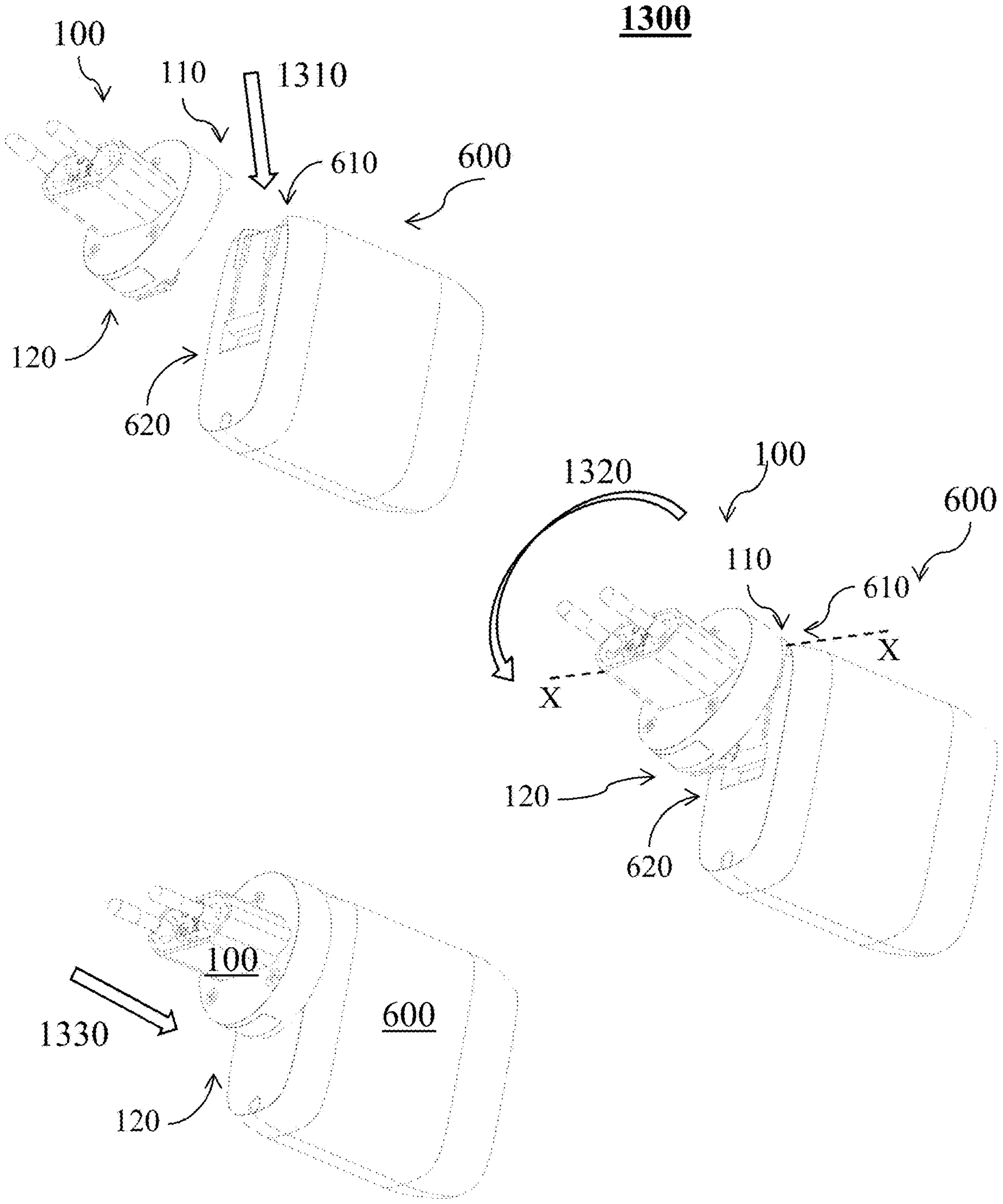
FIG. 13 illustrates motions by a user (not shown) for mounting the interchangeable plug of FIG. 1 onto the portable power adapter of FIG. 6.

Turning ahead in the drawings, FIG. 12 illustrates a flow chart of a method 1200, and FIG. 13 illustrates an exemplary series of corresponding user motions 1300 for mounting an interchangeable plug onto a power adapter, according to an embodiment. The power adapter can be any power adapters discussed above (e.g., power adapter 600 or 1100 (FIG. 11), etc.), and the interchangeable plug can be any interchangeable plugs (e.g., interchangeable plug 100, 100A (FIG. 4), 100B (FIG. 5), or 1000 (FIG. 10), etc.) suitable for the power adapter. Method 1200 can include one or more acts to be discussed below, and series of corresponding user motions 1300 can include one or more user motions corresponding to some or all of the acts of method 1200. Some or all of the one or more acts of method 1200 can be combined, replaced, or skipped. The one or more acts of method 1200 further can be performed in the order presented or any suitable order. Additionally, in many embodiments, method 1200 and/or series of user motions 1300, entirely or partly, can be performed using a single hand.

In many embodiments, method 1200 can include a block 1210 of obtaining a power adapter with the adapter prongs in the folded position. Method 1200 further can include a block 1220 of releasably coupling a first coupling mechanism (e.g., first coupling mechanism 110 or 1010 (FIG. 10), etc.) of the interchangeable plug to a first engagement mechanism (e.g., first engagement mechanism 610 or 1110 (FIG. 11), etc.) of the power adapter. In some embodiments, block 1220 can include a block 1221 of causing a first hook (of the first coupling mechanism or the first engagement mechanism) (e.g., first hook 111 or 1111 (FIG. 11), etc.) to be received by a first latch (of the first engagement mechanism or of the first coupling mechanism) (e.g., first latch 611 or 1011 (FIG. 10), etc.). Meanwhile, series of corresponding user motions 1300 can include a corresponding user motion 1310 of pushing first coupling mechanism 110 of interchangeable plug 100 toward first engagement mechanism 610 of power adapter 600 until first hook 111 (FIG. 1, not shown here) is received by first latch 611 (FIG. 6, not shown here).

Method 1200 further can include a block 1230 of rotating the interchangeable plug (e.g., interchangeable plug 100, 100A (FIG. 4), 100B (FIG. 5), 1000 (FIG. 10), etc.), along an axis (e.g., axis X-X) through the first engagement mechanism (e.g., first engagement mechanism 610 or 1110 (FIG. 11)) toward the second engagement mechanism (e.g., second engagement mechanism 620 or 1120 (FIG. 11)) of the power adapter (e.g., power adapter 600 or 1100 (FIG. 11)), after coupling the first coupling mechanism and the first engagement mechanism. Meanwhile, series of corresponding user motions 1300 further can include a corresponding user motion 1320 of rotating interchangeable plug 100 along axis X-X through first engagement mechanism 610, when coupled to first coupling mechanism 110, toward second engagement mechanism 620.

Method 1200 further can include a block 1240 of releasably coupling a second coupling mechanism (e.g., second coupling mechanism 120 or 1020 (FIG. 10)) of the interchangeable plug (e.g., interchangeable plug 100, 100A (FIG. 4), 100B (FIG. 5), 1000 (FIG. 10), etc.) to a second engagement mechanism (e.g., second engagement mechanism 620 or 1120 (FIG. 11)) of the power adapter (e.g., power adapter 600 or 1100 (FIG. 11)). In a number of embodiments, block 1240 can include a block 1241 of causing a second hook (of the second coupling mechanism or the second engagement mechanism) (e.g., second hook 121 (FIG. 1) or 1021 (FIG. 10)) to be received by a second latch (of the second engagement mechanism or the second coupling mechanism) (e.g., second latch 621 (FIG. 6) or 1121 (FIG. 11)). Meanwhile, series of corresponding user motions 1300 further can include a corresponding user motion 1330 of pushing second coupling mechanism 120 of interchangeable plug 100 toward second engagement mechanism 620 of power adapter 600 until second hook 121 (FIG. 1, not shown here) is received by second latch 621 (FIG. 6, not shown here).

Figure 15:
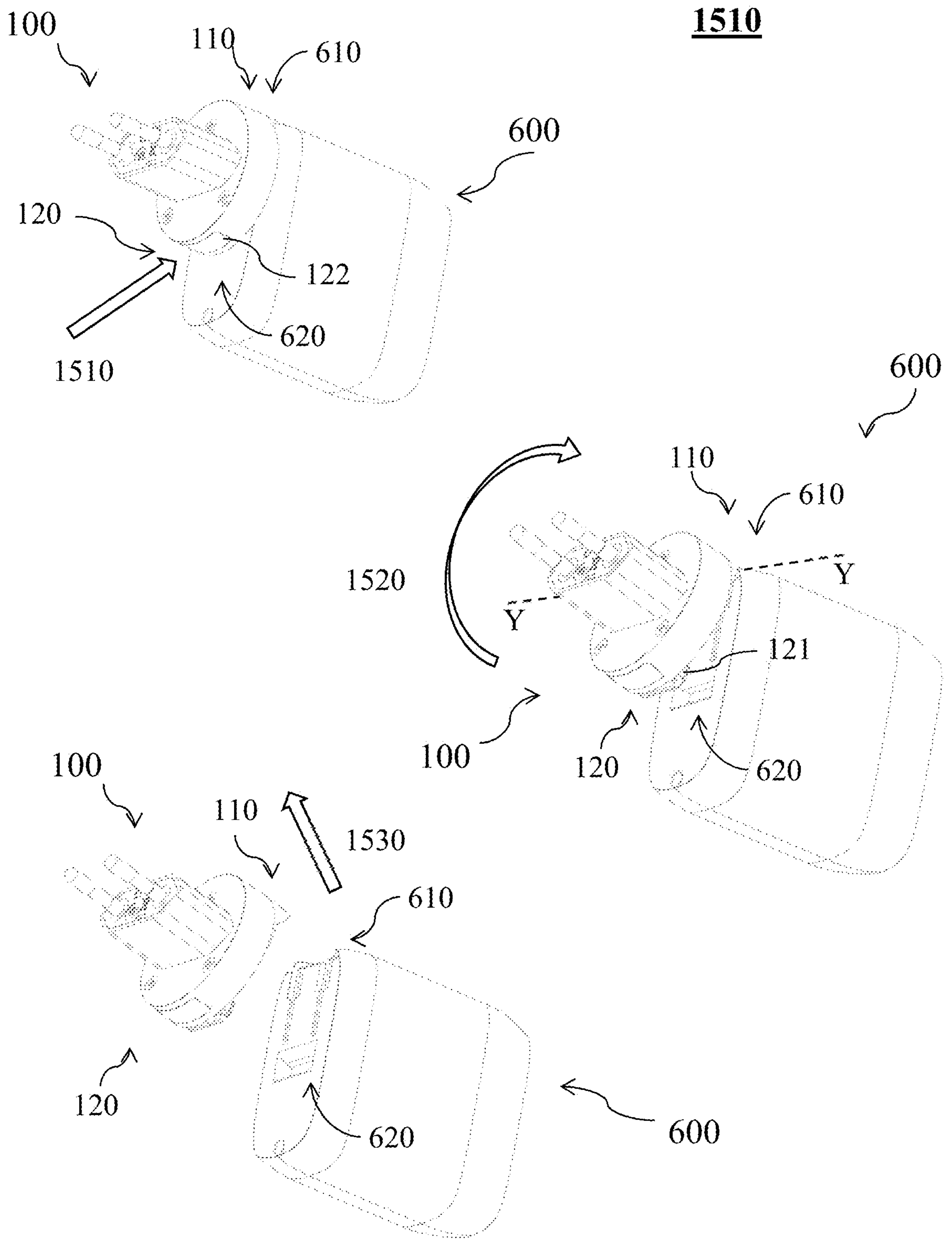
FIG. 15 illustrates motions by a user (not shown) for dismounting the interchangeable plug of FIG. 1 from the portable power adapter of FIG. 6.

Turning ahead in the drawings, FIG. 14 illustrates a flow chart of a method 1400, and FIG. 15 illustrates an exemplary series of corresponding user motions 1500 for dismounting an interchangeable plug mounted from a portable power adapter, according to an embodiment. The power adapter can be any power adapters discussed above (e.g., power adapter 600 or 1100 (FIG. 11), etc.), and the interchangeable plug can be any interchangeable plugs (e.g., interchangeable plug 100, 100A (FIG. 4), 100B (FIG. 5), or 1000 (FIG. 10), etc.) suitable for the power adapter. Method 1400 can include one or more acts to be discussed below, and series of corresponding user motions 1500 can include one or more user motions corresponding to some or all of the acts of method 1400. Some or all of the one or more acts of method 1400 can be combined, replaced, or skipped. The one or more acts of method 1400 further can be performed in the order presented or any suitable order. Further, in many embodiments, method 1400 and/or series of user motions 1500, entirely or partly, can be performed using a single hand.

Method 1400 can include a block 1410 of decoupling the second coupling mechanism (e.g., second coupling mechanism 120 or 1020 (FIG. 10)) of the interchangeable plug (e.g., interchangeable plug 100, 100A (FIG. 4), 100B (FIG. 5), or 1000 (FIG. 10)) from the second engagement mechanism (e.g., second engagement mechanism 620 or 1120 (FIG. 11)) of the power adapter (e.g., power adapter 600 or 1100 (FIG. 11)). Method 1400 can include a block 1411 of causing a second hook (of the second coupling mechanism or the second engagement mechanism) (e.g., second hook 121 or 1021 (FIG. 10)) to be released by a second latch (of the second engagement mechanism or the second coupling mechanism) (e.g., second latch 621 (FIG. 6, not shown here) or 1121 (FIG. 11)). In some embodiments, causing the second hook to be released by the second latch can include pushing a spring-loaded button (of the second coupling mechanism or the second engagement mechanism) (e.g., button 122 or button 1122 (FIG. 11)) to cause the second hook (e.g., second hook 121) or the second latch (e.g., second latch 1121 (FIG. 11)) to move away from the second latch (e.g., second latch 621 (FIG. 6)) or the second hook (e.g., second hook 1021 (FIG. 10)) so that the second hook can be released by the second latch. Meanwhile, series of corresponding user motions 1500 can include a corresponding user motion 1510 of pushing button 122 to cause second hook 121 to move away from second latch 621 (FIG. 6, not shown here) until second hook 121 is released by second latch 621 (FIG. 6).

Method 1400 further can include a block 1420 of rotating the interchangeable plug (e.g., interchangeable plug 100, 100A (FIG. 4), 100B (FIG. 5), or 1000 (FIG. 10)) along an axis (e.g., axis Y-Y) through the first engagement mechanism (e.g., first engagement mechanism 610 or 1110 (FIG. 11)) away from the second engagement mechanism (e.g., second engagement mechanism 620 or 1120 (FIG. 11)) of the power adapter (e.g., power adapter 600 or 1100 (FIG. 11)), after the second coupling mechanism is decoupled from the second engagement mechanism. Meanwhile, series of corresponding user motions 1500 further can include a corresponding user motion 1520 of rotating interchangeable plug 100 along axis Y-Y so that second coupling mechanism 120, decoupled from second engagement mechanism 620, moves away from second engagement mechanism 620 while first coupling mechanism 110 is still coupled to first engagement mechanism 610.

Method 1400 additionally can include a block 1430 of decoupling the first coupling mechanism (e.g., first coupling mechanism 110 or 1010 (FIG. 10)) of the interchangeable plug (e.g., interchangeable plug 100 or 1000 (FIG. 10)) from the first engagement mechanism (e.g., first engagement mechanism 610 or 1110 (FIG. 11)) of the power adapter (e.g., power adapter 600 or 1100 (FIG. 11)). Block 1430 can include a block 1431 of causing a first hook (of the first coupling mechanism or the first engagement mechanism) (e.g., first hook 111 (FIG. 1, not shown here) or 1121 (FIG. 11)) to be released by a first latch (of the first engagement mechanism or the first coupling mechanism) (e.g., first latch 611 (FIG. 6, not shown here) or 1011 (FIG. 10)). Meanwhile, series of corresponding user motions 1500 further can include a corresponding user motion 1530 of decoupling first coupling mechanism 110 from first engagement mechanism 610 by pulling first hook 111 (FIG. 1) out of first latch 611 (FIG. 6).

Although the interchangeable plug and the power adapter have been described with reference to specific embodiments, it will be understood by those skilled in the art that various changes may be made without departing from the spirit or scope of the disclosure. For example, the first/second coupling mechanisms and the first/second engagement mechanisms can include any suitable combinations of fastening mechanisms (e.g., hooks and latches, pins and holes, magnets, hook-and-loop fasteners, etc.). The one or more adapter-prong channels can include a respective adapter-prong channel for each adapter prong. In different or similar embodiments, at least one of the one or more adapter-prong channels can include an indented area for receiving all or some of the folded adapter prongs. Further, the one or more alignment structures can include the ribs as shown in FIG. 1 or any other suitable structures (e.g., pins, holes, grooves, etc.) that can prevent lateral movement when the interchangeable plug is mounted on the power adapter. In certain embodiments, some or all of the one or more alignment structures are not configured to be received in the adapter-prong channel(s) but rather be coupled to the corresponding structure(s) of the power adapter. For example, the one or more alignment structures can include a pin raised from the rear surface of the interchangeable plug, and the pin can be received in a hole on the front surface of the power adapter, when the interchangeable plug is mounted on the power adapter. Accordingly, the disclosure of embodiments is intended to be illustrative of the scope of the disclosure and is not intended to be limiting. It is intended that the scope of the disclosure shall be limited only to the extent required by the appended claims.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An interchangeable plug for a power adapter comprising:

a first coupling mechanism raised above a rear surface of the interchangeable plug and configured to be releasably coupled to a first engagement mechanism of the power adapter when the interchangeable plug is mounted on the power adapter; and a second coupling mechanism raised above the rear surface of the interchangeable plug and configured to be releasably coupled to a second engagement mechanism of the power adapter when the interchangeable plug is mounted on the power adapter, wherein:

the interchangeable plug is configured to be mounted on the power adapter by rotating the interchangeable plug along an axis through the first engagement mechanism toward the second engagement mechanism of the power adapter after the first coupling mechanism is releasably coupled to the first engagement mechanism and before the second coupling mechanism is releasably coupled to the second engagement mechanism; and the first coupling mechanism and the second coupling mechanism are separate and located on opposite ends of the interchangeable plug.

2. The interchangeable plug of claim 1, wherein, when the interchangeable plug is mounted on the power adapter, one or more of:

a first hook of the first coupling mechanism is received by a first latch of the first engagement mechanism of the power adapter; or a second hook of the second coupling mechanism is received by a second latch of the second engagement mechanism of the power adapter.

3. The interchangeable plug of claim 1, wherein one or more of:

a second hook of the second coupling mechanism is movable to be received or released by a second latch of the second engagement mechanism along a single direction along which adapter prongs of the power adapter extend when the adapter prongs are in a folded position;

the second hook of the second coupling mechanism is movable toward or away from the first coupling mechanism to be received or released by the second latch of the second engagement mechanism;

the second latch of the second engagement mechanism is movable to receive or release the second hook of the second coupling mechanism along the single direction; or the second latch of the second engagement mechanism is movable toward or away from the first engagement mechanism to receive or release the second hook of the second coupling mechanism.

4. The interchangeable plug of claim 1, further comprising one or more of:

adapter prong contacts configured to be electronically coupled to adapter prongs of the power adapter when the interchangeable plug is mounted on the power adapter;

one or more alignment structures located between the first coupling mechanism and the second coupling mechanism; or plug prongs electronically coupled to the adapter prong contacts.

5. The interchangeable plug of claim 4, wherein one or more of:

when the interchangeable plug comprises the one or more alignment structures, the one or more alignment structures are raised from the rear surface of the interchangeable plug and configured to be received in an adapter-prong channel of the power adapter for the adapter prongs when the interchangeable plug is mounted on the power adapter; or when the interchangeable plug comprises the plug prongs, a plug prong arrangement for the plug prongs is different from an adapter prong arrangement for the adapter prongs.

6. The interchangeable plug of claim 1, wherein one or more of:

(a) the first engagement mechanism and the second engagement mechanism of the power adapter are located at opposite sides of adapter prongs of the power adapter; or (b) the adapter prongs of the power adapter are foldable; and the adapter prongs comprise a folded position and an unfolded position.

7. The interchangeable plug of claim 1 further comprising:

adapter prong contacts configured to be electronically coupled to adapter prongs of the power adapter when the interchangeable plug is mounted on the power adapter and the adapter prongs of the power adapter are in a folded position.

8. A method for providing an interchangeable plug for a power adapter, the method comprising:

providing the interchangeable plug comprising:

a first coupling mechanism raised above a rear surface of the interchangeable plug and configured to be releasably coupled to a first engagement mechanism of the power adapter when the interchangeable plug is mounted on the power adapter; and a second coupling mechanism raised above the rear surface of the interchangeable plug and configured to be releasably coupled to a second engagement mechanism of the power adapter when the interchangeable plug is mounted on the power adapter, wherein:

the interchangeable plug is configured to be mounted on the power adapter by rotating the interchangeable plug along an axis through the first engagement mechanism toward the second engagement mechanism of the power adapter after the first coupling mechanism is releasably coupled to the first engagement mechanism and before the second coupling mechanism is releasably coupled to the second engagement mechanism; and the first coupling mechanism and the second coupling mechanism are separate and located on opposite ends of the interchangeable plug.

9. The method in claim 8, wherein, when the interchangeable plug is mounted on the power adapter:

a first hook of the first coupling mechanism is received by a first latch of the first engagement mechanism of the power adapter; or a second hook of the second coupling mechanism is received by a second latch of the second engagement mechanism of the power adapter.

10. The method in claim 8, wherein one or more of:

a second hook of the second coupling mechanism is movable to be received or released by a second latch of the second engagement mechanism along a single direction along which adapter prongs of the power adapter extend when the adapter prongs are in a folded position;

the second hook of the second coupling mechanism is movable toward or away from the first coupling mechanism to be received or released by the second latch of the second engagement mechanism;

the second latch of the second engagement mechanism is movable to receive or release the second hook of the second coupling mechanism along the single direction; or the second latch of the second engagement mechanism is movable toward or away from the first engagement mechanism to receive or release the second hook of the second coupling mechanism.

11. The method in claim 8, wherein the interchangeable plug further comprises one or more of:

adapter prong contacts configured to be electronically coupled to adapter prongs of the power adapter when the interchangeable plug is mounted on the power adapter;

one or more alignment structures located between the first coupling mechanism and the second coupling mechanism; or plug prongs electronically coupled to the adapter prong contacts.

12. The method in claim 11, wherein one or more of:

when the interchangeable plug comprises the one or more alignment structures, the one or more alignment structures are raised from the rear surface of the interchangeable plug and configured to be received in an adapter-prong channel of the power adapter for the adapter prongs when the interchangeable plug is mounted on the power adapter; or when the interchangeable plug comprises the plug prongs, a plug prong arrangement for the plug prongs is different from an adapter prong arrangement for the adapter prongs.

13. The method in claim 8, wherein one or more of:

(a) the first engagement mechanism and the second engagement mechanism of the power adapter are located at opposite sides of adapter prongs of the power adapter; or (b) the adapter prongs of the power adapter are foldable; and the adapter prongs comprise a folded position and an unfolded position.

14. A method for using an interchangeable plug for a power adapter, the method comprising:

mounting the interchangeable plug onto the power adapter comprising:

releasably coupling a first coupling mechanism of the interchangeable plug to a first engagement mechanism of the power adapter;

after releasably coupling the first coupling mechanism of the interchangeable plug to the first engagement mechanism of the power adapter, rotating the interchangeable plug along an axis through the first engagement mechanism toward a second engagement mechanism of the power adapter; and releasably coupling a second coupling mechanism of the interchangeable plug to the second engagement mechanism of the power adapter, wherein:

the first coupling mechanism is raised above a rear surface of the interchangeable plug;

the second coupling mechanism is raised above the rear surface of the interchangeable plug; and the first coupling mechanism and the second coupling mechanism are separate and located on opposite ends of the interchangeable plug.

15. The method in claim 14, wherein one or more of:

releasably coupling the first coupling mechanism of the interchangeable plug to the first engagement mechanism of the power adapter comprises causing a first hook of the first coupling mechanism to be received by a first latch of the first engagement mechanism of the power adapter; or releasably coupling the second coupling mechanism of the interchangeable plug to the second engagement mechanism of the power adapter comprises causing a second hook of the second coupling mechanism to be received by a second latch of the second engagement mechanism of the power adapter.

16. The method in claim 14, wherein one or more of:

a second hook of the second coupling mechanism is movable to be received or released by a second latch of the second engagement mechanism along a single direction along which adapter prongs of the power adapter extend when the adapter prongs are in a folded position;

the second hook of the second coupling mechanism is movable toward or away from the first coupling mechanism to be received or released by the second latch of the second engagement mechanism;

the second latch of the second engagement mechanism is movable to receive or release the second hook of the second coupling mechanism along the single direction; or the second latch of the second engagement mechanism is movable toward or away from the first engagement mechanism to receive or release the second hook of the second coupling mechanism.

17. The method in claim 14, wherein the interchangeable plug further comprises one or more of:

adapter prong contacts configured to be electronically coupled to adapter prongs of the power adapter when the interchangeable plug is mounted on the power adapter;

one or more alignment structures located between the first coupling mechanism and the second coupling mechanism; or plug prongs electronically coupled to the adapter prong contacts.

18. The method in claim 17, wherein one or more of:

when the interchangeable plug comprises the one or more alignment structures, the one or more alignment structures are raised from the rear surface of the interchangeable plug and configured to be received in an adapter-prong channel of the power adapter for the adapter prongs when the interchangeable plug is mounted on the power adapter; or when the interchangeable plug comprises the plug prongs, a plug prong arrangement for the plug prongs is different from an adapter prong arrangement for the adapter prongs.

19. The method in claim 14, wherein one or more of:

(a) the first engagement mechanism and the second engagement mechanism of the power adapter are located at opposite sides of adapter prongs of the power adapter; or (b) the adapter prongs of the power adapter are foldable; and the adapter prongs comprise a folded position and an unfolded position.

20. The method in claim 14, further comprising:

dismounting the interchangeable plug from the power adapter comprising:

decoupling the second coupling mechanism of the interchangeable plug from the second engagement mechanism of the power adapter; and decoupling the first coupling mechanism of the interchangeable plug from the first engagement mechanism of the power adapter.

* * * * *